(12) United States Patent
Strongin et al.

(10) Patent No.: US 6,389,488 B1
(45) Date of Patent: May 14, 2002

(54) READ AHEAD BUFFER FOR READ ACCESSES TO SYSTEM MEMORY BY INPUT/OUTPUT DEVICES WITH BUFFER VALID INDICATION

(75) Inventors: Geoffrey S. S. Strongin, Austin; David W. Smith, Cedar Park; Norman Hack, Pflugerville, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/238,829

(22) Filed: Jan. 28, 1999

(51) Int. Cl.[7] .............................................. G06F 13/00
(52) U.S. Cl. ................. 710/52; 710/4; 710/7
(58) Field of Search .................... 710/1, 4, 5, 20, 710/21, 36, 52, 53, 55, 56, 57–61, 7, 26, 65, 9, 31, 117

(56) References Cited

U.S. PATENT DOCUMENTS

| | | | | |
|---|---|---|---|---|
| 5,157,692 A | * | 10/1992 | Horie et al. ................... 375/38 |
| 5,408,613 A | * | 4/1995 | Okabayashi ................ 395/272 |
| 5,590,374 A | * | 12/1996 | Shariff et al. ................... 710/9 |
| 5,603,052 A | * | 2/1997 | Chejlava, Jr. et al. .......... 710/4 |
| 5,640,596 A | * | 6/1997 | Takamoto et al. ............ 710/21 |
| 5,745,915 A | * | 4/1998 | Cooper et al. .............. 711/114 |
| 5,765,189 A | * | 6/1998 | Treiber et al. .............. 711/117 |
| 5,809,280 A | * | 9/1998 | Chard et al. ................. 711/160 |
| 6,084,686 A | * | 7/2000 | Ushida ....................... 358/1.16 |
| 6,092,145 A | * | 7/2000 | Kigami et al. ................. 711/4 |
| 6,108,748 A | * | 8/2000 | Ofek et al. .................. 711/112 |

* cited by examiner

Primary Examiner—Thomas Lee
Assistant Examiner—Ri Jue Mai
(74) Attorney, Agent, or Firm—Zagorin, O'Brien & Graham, LLP

(57) ABSTRACT

A computer system includes a read ahead buffer coupled to a memory controller and an input/output controller coupled to an input/output channel. An I/O device provides an initial read request over the input/output channel which specifies an address in system memory. The memory controller retrieves an amount of data from system memory larger than specified by the read request and provides the requested data to the input/output channel and thus the I/O device. At least a portion of the data retrieved from system memory is stored in the read ahead buffer. The read ahead buffer is marked as valid and identified by at least a portion of the address specified in the read request. When the same I/O device performs a subsequent read access, the I/O request circuit determines whether at least a portion of the address of the subsequent read request matches the portion of the address identifying the read ahead buffer and provides a tag match signal as an indication thereof. Data is then selectively provided from either the read ahead buffer or system memory to the input/output device in response to the second read request according to the tag match signal and the valid indication.

10 Claims, 2 Drawing Sheets

READ AHEAD BUFFER FOR READ ACCESSES TO SYSTEM MEMORY BY INPUT/OUTPUT DEVICES WITH BUFFER VALID INDICATION

BACKGROUND OF THE INVENTION

1. Field of the Invention

This invention relates to accesses to memory by input/output devices and more particularly to providing more efficient accesses to system memory.

2. Description of the Related Art

Computer systems rely on complex logic to communicate data within and between its various subsystems. Referring to FIG. 1, which illustrates relevant aspects of an exemplary prior art computer system, memory controller 10 resides on an integrated circuit 12 coupled between main memory 30 and a central processing unit (CPU) (not shown). Integrated circuit 12 typically includes an input/output (I/O) controller circuit 20 that interfaces to an I/O channel such as the Peripheral Component Interconnect (PCI) bus. The memory controller controls access to the main memory by various components of the computer system. For example, read requests from the I/O channel are provided to the memory controller circuit 10 which then accesses memory 30 to retrieve the requested data.

Note that in addition, to main memory, "system memory" in computer systems may also include cache memory. It is fairly typical for the CPU to have access to one or two levels of cache memory which provide the CPU local copies of data stored in the main memory. The availability of the local copies of data (and instructions) speeds up memory access by the CPU since the CPU only has to access the local copy rather than main memory. A variety of techniques known in the art maintain coherency between the cache memories and the main memory. When a read request is received over the I/O channel for data in main memory, the cache memories are "snooped" to determine if an updated version of the data is available. The most up to date data is then provided in response to the read request.

The access to main memory is an important aspect of the computer system that requires a high level of efficiency to ensure good system performance. One problem with main memory is that it is almost always dynamic random access memory (DRAM), and read accesses to this type of memory require a primary slow read access cycle, where the entire memory 'page' is accessed, and then after that period (but before any other page is accessed) additional read accesses can occur very quickly as long as they are all addressed in that existing 'page' (where page size is DRAM-type and size dependent). That fact encourages designs that read as much data from a DRAM as possible at one time, in a contiguous burst to reduce the average word access time.

Many CPU and CPU interface chips utilize this block read process to retrieve instructions for processors to execute, because most modern processors retrieve instructions in blocks as described above. Such accesses for blocks of instructions take a longer time (page access time) to access the first instruction in the block, e.g., several bus clock cycles, but then the remaining accesses are each very quick, taking only, e.g., one additional clock per access. That feature is further used by current cache controller designs that access memory only in cache 'line' sizes which are groups of data sized to the operation of the internal processor cache.

Because accesses to main memory can be of different types and sizes, some individual accesses and some block accesses as described above, the memory controller tailors its access to the type of request. It would be inefficient to read an entire cache line worth of memory (or even more), if only the first word was needed. Such an extraneous access, even if seemingly an efficient way to retrieve data, actually wastes memory and bus bandwidth. Also, non-processor accesses, from mastering devices on external busses, such as the PCI bus, Advanced Graphics Port (AGP) and Industry Standard Architecture (ISA), as well as the DMA (direct memory access) controller in personal computer (PC) systems, access memory in different ways. Accordingly, memory controllers have typically accepted non-CPU accesses to memory as either all individual accesses or as all block accesses. If the memory controller treats non-CPU accesses as all individual accesses, each access requires a re-issuance of each individual memory request. If the memory treats all non-CPU accesses as block accesses then the memory controller may end up reading more data than is needed, thus wasting bandwidth and memory resource.

When certain I/O devices require access to main memory, especially when reading, their accesses are mostly to sequential words in memory. Slower I/O devices may frequently read sequential words of data but read them one at a time. Such slower I/O devices issue a new read request for each sequential word of read data requested by the I/O device. Such slower I/O based accesses therefore always require a 'new' access by the memory controller to service the I/O controller request (irrespective of the memory-access policy of the memory controller). To service such memory requests, the memory controller accesses the memory using an initial access type (primary slow read access) and then continues to use the slow initial access type for each subsequent read request even though each read cycle may access the same DRAM page. The re-requesting of the same memory page is costly and robs bandwidth from other peripherals and the CPU.

Additionally, since most memory controllers are already optimized to read a fall CPU cache line of data (typically four 32-bit words) at once, the additional time used to access a full CPU cache line is further wasted for each single word read request, as the I/O device uses only the single word of data, and a whole cache line (maybe the same cache line) is re-requested for each of the contiguous words of data requested by the I/O device. Thus, reading eight sequential words may require reading the same cache line eight times.

It would therefore be desirable to have an approach for I/O accesses that takes accounts for the type of I/O access being made (block or single word) and makes efficient use of data that has already been accessed.

SUMMARY OF THE INVENTION

In one embodiment, the invention provides an integrated circuit coupled between system memory of a computer system and an input/output channel such as the PCI bus. The integrated circuit includes an input/output request circuit that receives a read request for data in system memory from an input/output device over the input/output channel. A read ahead buffer which is coupled to the input/output request circuit, stores data from a previous read access to system memory. The input/output request circuit is coupled to selectively provide data from either the system memory or the read ahead buffer in response to the read request.

In another embodiment, a method of operating a computer system is provided. The computer system includes a read ahead buffer coupled to a memory controller and an input/output controller coupled to an input/output channel. An I/O device provides an initial read request over the input/output channel which specifies an address in system memory. The memory controller retrieves an amount of data from system memory larger than specified by the read request and provides the requested data to the input/output channel and thus to the I/O device. At least a portion of the data retrieved from system memory is stored in the read ahead buffer. The read ahead buffer is marked as valid and identified by at least a portion of the address specified in the read request. When the same I/O device performs a subsequent read access, the I/O request circuit determines whether at least a portion of the address of the subsequent read request matches the portion of the address identifying the read ahead buffer and provides a tag match signal as an indication thereof. Data is then selectively provided from either the read ahead buffer or system memory to the input/output device in response to the second read request according to the tag match signal and the valid indication.

BRIEF DESCRIPTION OF THE DRAWINGS

The present invention may be better understood, and its numerous objects, features, and advantages made apparent to those skilled in the art by referencing the accompanying drawings wherein the use of the same reference symbols in different drawings indicates similar or identical items.

DESCRIPTION OF THE PREFERRED EMBODIMENT(S)

Figure 2:
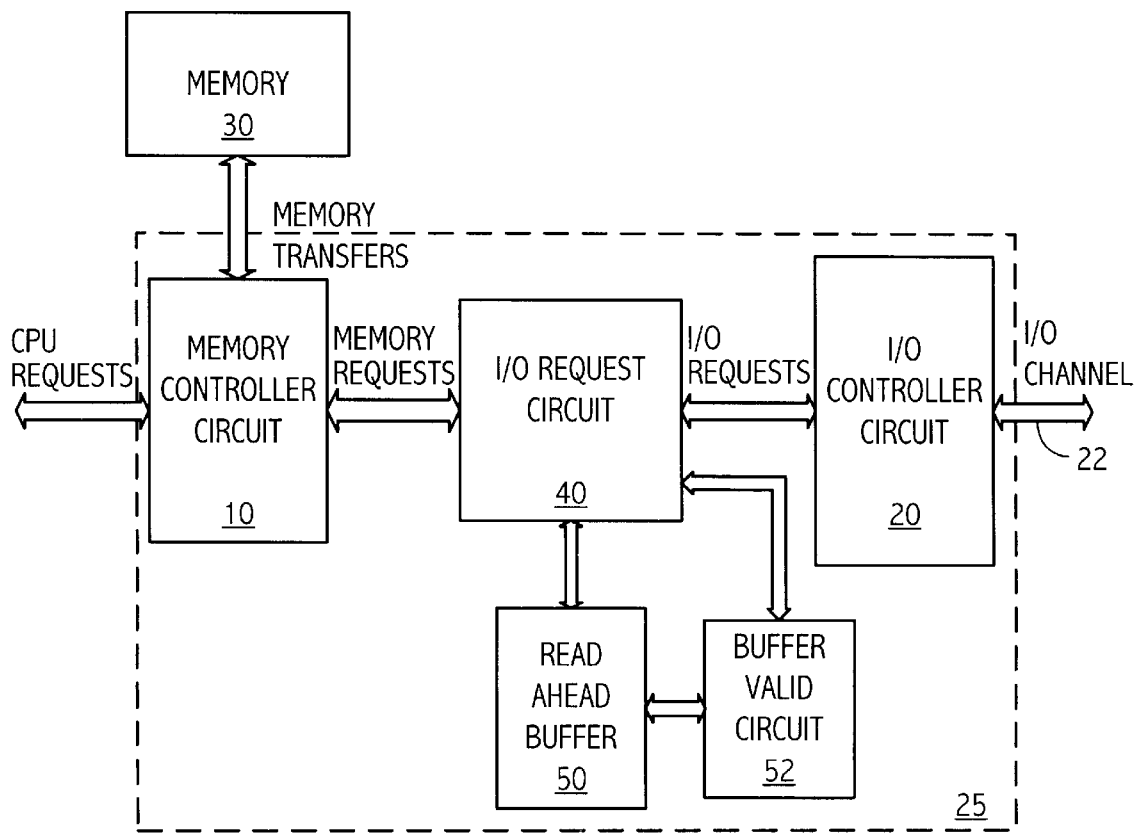
FIG. 2 illustrates an exemplary embodiment of the present invention showing the read ahead buffer and associated control logic.

Referring to FIG. 2, memory access and I/O control circuit 25 includes I/O request circuit 40 which is coupled between I/O controller circuit 20 and memory controller circuit 10. I/O request circuit 40 interfaces with a standard I/O channel such as the PCI bus and is conventional. Memory controller 10 is also conventional and is not described further herein. Transient read-ahead buffer 50 is coupled to I/O request circuit 40 and provides a temporary cache for data read access requests from I/O channel 22.

The read ahead buffer 50 functions as an 'incoherent transient cache' that holds burst data read from main memory for read accesses initiated from the I/O channel. That cached data may be provided to the I/O controller in place of data from system memory to make I/O read requests more efficient. Once data in the read ahead buffer is considered valid, it remains valid until some specified condition (s) described herein cause the data to be invalidated. The read ahead buffer holds one or more groups of data. Each group may be identified by their original address in main memory.

I/O request circuit 40, upon receiving a read request from an I/O device through I/O controller circuit 20, may take one of several actions. Depending upon whether a particular I/O device is enabled for read ahead operations and the size of the read request, the I/O request circuit, upon receiving a read request, may request the exact data size from system memory, or request larger amounts of data from memory than the size of the read request. In addition, if the read ahead buffer is enabled for the particular I/O device request-ing the read access, the I/O request circuit may provide the requested data to the I/O channel from the read ahead buffer. Under certain conditions, specified in greater detail herein, the I/O request circuit may invalidate the contents of one or more read ahead buffers in response to a read request.

In one embodiment, the invention operates as follows. When the system is first initialized, either in the basic input/output system (BIOS) or the operating system (OS) (or any other mechanism that controls I/O devices), the system (or user) determines the data requirement in terms of the types of reads performed by each I/O device of each channel that is to exploit the invention described herein. I/O devices that are likely to read large sequential blocks of data are enabled for block read-ahead at this time, and devices that read small amounts of data, single words or those devices whose accesses are heavily random are disabled for block read-ahead. Selectively enabling the read ahead mechanism for I/O devices allows the system to be tuned to efficiently use the read ahead buffer mechanism for appropriate I/O devices. Note that the approach described herein can work with any I/O channel.

When an input/output device (such as a PCI-based ethernet controller) which is enabled for block read ahead, requests (through its I/O channel) byte(s) of data from main memory, the I/O request circuit 40 requests the memory controller to provide more data than actually requested. The amount of additional data requested may be determined by such factors as the width of the memory, page size, the cache line size, the size of the read ahead buffer or a combination of those and other factors. The memory controller 10 retrieves the requested data and the I/O request circuit provides the requested word to the I/O device through the I/O controller circuit and the I/O channel. The extra data read out from system memory is stored in the transient read ahead buffer 50 in anticipation of subsequent accesses to the same region of memory by the same input/output device. When a subsequent access does occur to the same region of memory by the same input/output device, the data is retrieved from the read ahead buffer rather than the main memory.

When the I/O device requests a block of data, the read ahead mechanism described herein may still be used advantageously. For example, if the block of data requested is smaller than the read ahead buffer, and additional sequential blocks are typical of the particular I/O device, reading out the larger amount of data may still provide a significant improvement in average access time. Alternatively, if the block size requested is the same or larger than the read ahead buffer, the read ahead mechanism may be selectively disabled, if that capability is provided, for that particular I/O device.

Note that although the PCI provides for burst transactions, typically the length of the burst is not known in advance and thus, the memory controller does not know when the "burst" will end. Consequently the memory controller does not know how much data to fetch from main memory. The "burst" transaction may continue on the PCI bus until the bus master gives up control of the bus. Therefore, the read ahead buffer of the present invention can be used advantageously even for devices using PCI burst transactions. That is due to the fact that systems can typically access data more quickly from memory than PCI transfer rates and reading ahead allows for more efficient transfer of data in the system. In addition, even if the burst length is known, the read ahead mechanism may still provide performance improvements.

The read ahead buffer can be of any appropriate size and organization of memory. For example, the buffer may be the same size as or larger than a cache line size. In addition, various organizations of the read ahead buffer are possible, For example, the read ahead buffer may be one buffer used by any I/O device during the course of a single I/O read. The read ahead buffer may in fact include multiple buffers with multiple address tags (determined by the read address), allowing multiple blocks of data to be cached and buffered for any one I/O device. In another implementation, the transient cache may have multiple buffers, each associated with a separate I/O device, allowing interleaved I/O device access. An address tag is associated with each of the buffers that indicates where in main memory the block of data resides.

Figure 1:
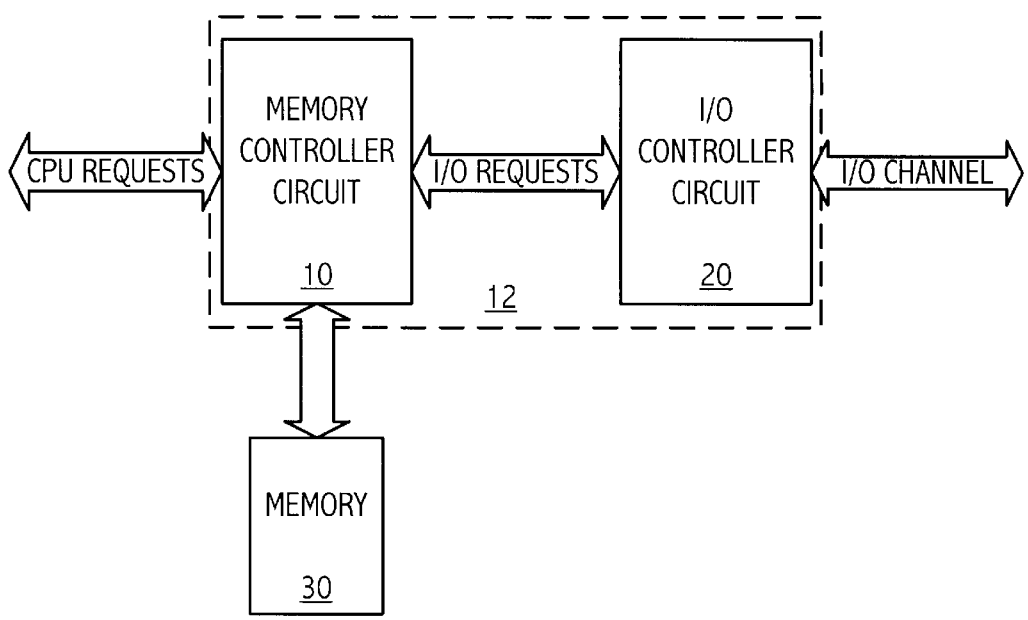
FIG. 1 illustrates a prior art memory controller, I/O controller and memory arrangement.

In systems that do not utilize the invention described herein, (see FIG. 1), an I/O device requests a single or a burst access read from memory. The I/O controller gets access to the memory and receives only what the memory controller provides with its current memory access policy (single word access or block access). That data is returned to the I/O device for writing. If the I/O device is reading a contiguous block and requires more data, a new address is reissued to the memory controller, once again opening the same page in memory (in many cases).

The I/O request circuit may be configured to enable each I/O device for the read ahead mechanism separately. Then, when a read request comes in over the I/O channel a look up is performed to determine if this I/O device has the read ahead mechanism enabled. For PCI based systems, the PCI controller knows which device is making an access request and that information is provided to the I/O request circuit 40 and/or buffer valid circuit 52. In other implementations, the read ahead mechanism may be enabled globally rather than device by device. Alternatively, the read ahead mechanism may be enabled for certain types of accesses. For example, the read ahead mechanism described herein may be particularly advantageous for DMA accesses to system memory, particularly legacy DMA accesses.

The read ahead buffer may also be advantageously employed in computer systems implementing buses other than the PCI bus for the major interconnect bus between the processor and input/output devices. For example, a communication link having multiple logical pipes with each pipe transmitting packets on a packet multiplexed basis may also advantageously use the invention described herein. Such a communication link is described in application No. 60/109, 589, filed Nov. 23, 1998 entitled "Computer Communication Link, which is incorporated herein by reference. In such a system, the source and target may be identified by a pipe identification number and thus the decision on whether to enable the read ahead mechanism can be made based on the pipe identification. Alternatively, information may be included in a particular byte of the packet identifying the read requester to thereby determine whether or not to enable the read ahead mechanism. In addition, the identification of the source of the read request is also used in the invalidity determinations as described further herein.

Note that the read ahead buffer is treated as an incoherent cache. Thus, data loaded into the read ahead buffer is not snooped by any other accesses to memory (other than the I/O read accesses). Further, read accesses from the read ahead buffer do not cause snooping of cache memories or the main memory to ensure that coherency maintained between the read ahead buffer, the main memory and cache memories. Thus, an access to the read ahead buffer does not guarantee that data has not been changed in system memory (either in cache memory or in main memory). That is not considered to be a problem since the time frame for a read access to memory by an I/O device is relatively short as is the time that any particular read ahead buffer remains valid. Further, present schemes to read contiguous data out of system memory one word at a time may read one word from a cache line and a second word from an updated cache line without there being any mechanism to prevent the contiguous block of data provided to the I/O device including both old and updated data, even for adjacent words.

For operation with the read-ahead mechanism, however, (see FIG. 2) when an I/O device makes a read request, the I/O request circuit first checks the read ahead buffer(s) to see if the addresses contained in the read ahead buffer matches the address of the word requested and if that buffer is valid. Whether there is a match between the requested address and the addresses of the read ahead buffer is typically determined by comparing the high order bits of the addresses. The number of high order bits compared depends on the size of the read ahead buffer. The low order bits of the address provide an index to access the correct entry in the read ahead buffer. If multiple buffers are used for a single or multiple I/O devices, each buffer is identified by an address which represents the location in system memory storing the data stored in the buffers. For a read access request, the I/O request circuit checks each of the buffers, or the buffer assigned to the particular I/O device to see if the address of the read request matches any of the buffers and if the data in the buffers is valid.

Any of a number of approaches can be used to determine when the read ahead buffer(s) are be marked as valid. For example, when data is read from system memory for a device that has the read ahead mechanism enabled and at least a portion of that data fills the read ahead buffer (also referred to herein as the caching buffer), the buffer is marked valid. Note that if blocks of data are entered into the caching read ahead buffer that are smaller than the read ahead buffer, then individual entries in the read ahead buffer need a validity indication. If the data fetched always matches the size of the read ahead buffer, a validity indication for the whole buffer will suffice.

If the address requested by the I/O controller is found in the cache, the data can be presented immediately to the I/O controller circuit 20 and hence to the requesting I/O device, without the time penalty of accessing main memory (or snooping processor cache memory). If the request circuit 40 determines that the address of the read request does not exist in the read ahead buffer, it can request the data from system memory. If the request circuit 40 identifies the request as being from a device that typically accesses data in blocks, the request circuit 40 requests a larger group of data accesses than would normally have been requested, without the read ahead mechanism enabled. The request circuit 40 forwards the data requested to the I/O controller (and through to the I/O device). The remainder of the block of data is placed in the read ahead buffer and marked as valid. Note that the data actually requested by the I/O controller (e.g., the one word or block requested) may also be placed in the read ahead buffer as well as the "remainder" of the block. Any amount of additional data requested that is likely to be requested during the same sequential access by the I/O device is provided from the read ahead buffer. That saves access time and lowers memory and bus bandwidth due to I/O accesses, as all the additional data is accessed by quick page mode burst accesses rather than repeated page accesses for single words in memory.

In addition to marking data as valid and determining if valid data is present in a read ahead buffer for a particular I/O device, the read ahead buffers also need to be marked invalid. Marking the read ahead buffers as invalid may be based upon a variety of invalidity algorithms. For example, at the end of an I/O channel access (such as a burst access in PCI) the read ahead buffer may be marked as invalid. Another example, the end of a DMA access may be used to mark the read ahead buffer as invalid. Another approach to marking a read ahead buffer as invalid is to use a time out mechanism in which the buffer(s) are marked as invalid after some predetermined period of time after the data was marked as valid. In that case, marking the data as valid loads a timer, which may have a programmable load value. When the timer has expired, the read ahead buffer is marked as invalid, if another invalidity criterion has not already been met.

Still another approach to invalidity is to mark the read ahead buffer as invalid when the I/O device reading data out of the buffer accesses an address outside of the transient cache buffer. An access to the region of memory stored in the caching read ahead buffer by a different I/O device or access by a different I/O device to any region of memory always invalidates the read ahead buffer. Additionally, the read ahead buffer may be marked as invalid when the last location in the read ahead buffer is provided to the I/O device.

Various combinations of these invalidity determinations may be used. For example, the time out may be used in combination with access to a region outside of the regions of memory stored in the read ahead buffer by the same device or access by a different I/O device. Once the invalidity determination is made, the buffer is marked invalid and the next access will have to go to system memory to retrieve data. If separate buffers are used for respective I/O devices, some of the above described criteria for making invalidity determinations may not apply. Thus, if interleaved accesses are allowed by different I/O devices, such accesses should not cause a buffer to be marked as invalid. Buffer valid circuit 52 implements one of more of the invalidity algorithms. In addition, the buffer valid circuit may implement the checks to determine if the address of the read request is contained within the read ahead buffer.

The I/O request circuit or the buffer valid circuit includes logic to perform the appropriate address compares, to check for validity, to cause the validity indications to be marked valid or invalid according to the conditions described herein. In addition the I/O request circuit routs data appropriately between the memory controller and the read ahead buffer. The routing can actually go through the I/O request circuit or the I/O request circuit controls the appropriate switching conditions (e.g. multiplexer selects) to rout data appropriately.

An exemplary computer system utilizing the present invention is shown in FIG. Memory access and interface control circuit 25 is coupled to memory 30. In the architecture shown, integrated circuit 25 is also referred to as the "north bridge" which provides a bridge function between memory 30, the CPU 61 and the PCI bus. The graphics subsystem 62 is also shown coupled to the north bridge via the AGP.

Figure 3:
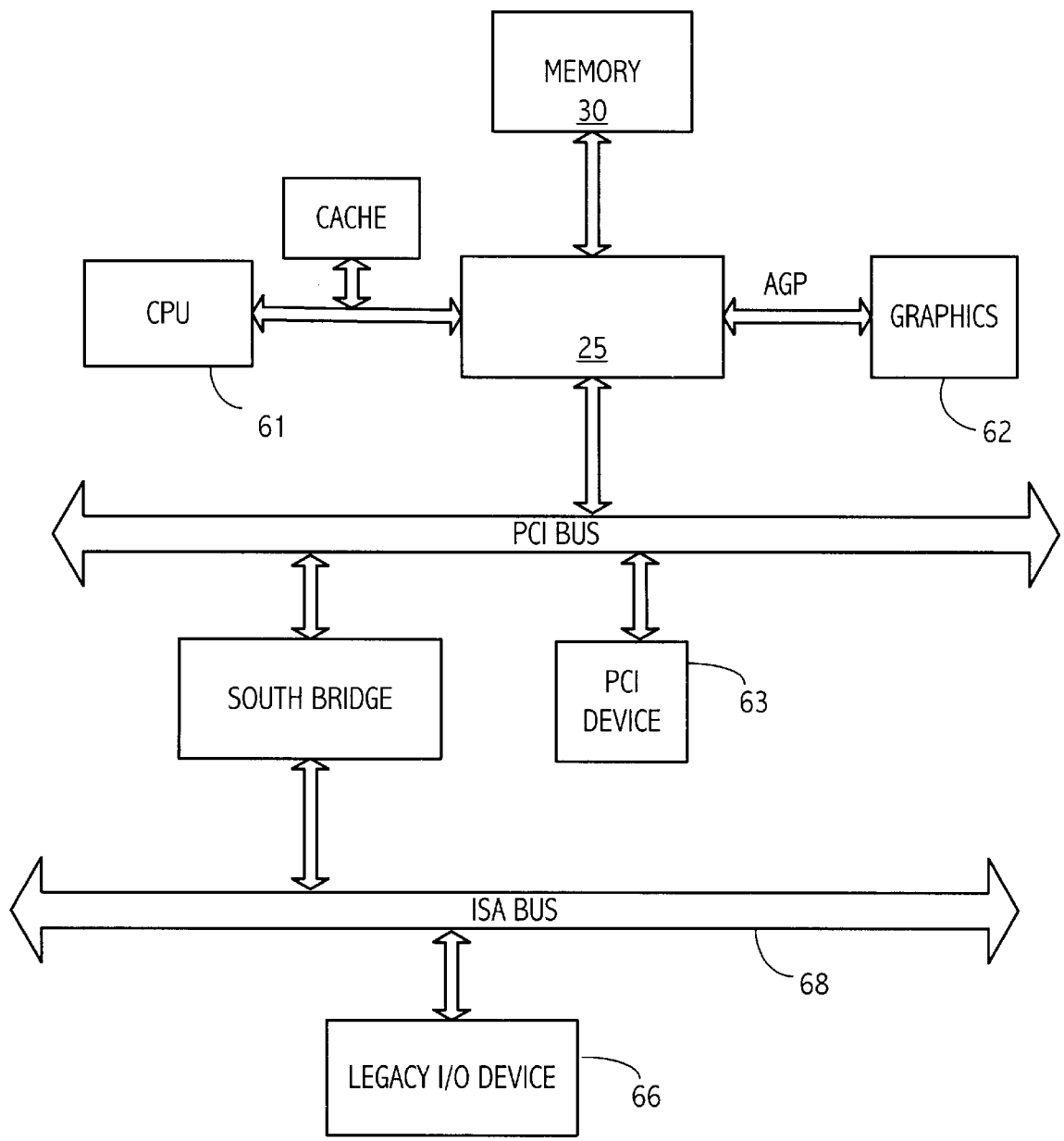
FIG. 3 illustrates an exemplary computer system utilizing the transient read ahead buffer arrangement shown in FIG. 2.

Exemplary input/output device 63 on the PCI bus may make read requests from memory 30 which utilize the transient read ahead buffer described herein. Slower legacy I/O devices 66 such as serial or parallel ports, coupled to ISA bus 68 also may make read requests that advantageously use the read ahead buffer described herein. The CPU which is shown as separate from the north bridge may in fact be integrated onto the north bridge. In addition, a high speed packet based communication link may replace the PCI bus coupling the north bridge and the south bridge. Other variations to the exemplary computer system shown in FIG. 3 would be apparent to one of skill in the art.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. An integrated circuit coupled between system memory of a computer system and an input/output channel, comprising:
   an input/output request circuit coupled to receive a read request for data in system memory from an input/output device over the input/output channel;
   a read ahead buffer coupled to the input/output request circuit, storing data from a previous read access to system memory, the input/output request circuit coupled to selectively provide data from one of the system memory and the read ahead buffer in response to the read request; and
   wherein the read ahead buffer includes at least one buffer of a predetermined size, the high order address bits of the read request identifying memory locations in the system memory corresponding to the at least one buffer; and
   wherein the read ahead buffer has an associated buffer valid indication, thereby indicating the validity of the buffer contents.

2. The integrated circuit as recited in claim 1 wherein the buffer valid indication is determined to be invalid at the end of a read access of a sequential block of data by the input/output device.

3. The integrated circuit as recited in claim 1 wherein the buffer valid indication is determined to be invalid at the end of a predetermined period of time after the buffer valid indication was determined to be valid.

4. The integrated circuit as recited in claim 1 wherein the buffer valid indication is set as valid when data is entered into the read ahead buffer, responsive to the read request by the input/output device.

5. The integrated circuit as recited in claim 4, wherein the buffer valid indication is determined to be invalid upon a subsequent access by the input/output device to an address outside of the read ahead buffer.

6. The integrated circuit as recited in claim 1 wherein the buffer valid indication is determined to be invalid upon access to the addresses stored in the read ahead buffer by a different input/output device.

7. The integrated circuit as recited in claim 1 wherein the buffer valid indication is determined to be invalid according to at least one of an end of a sequential access by the input/output device, an end of a predetermined period of time after the buffer valid indication was marked as valid, access by the input/output device to an address outside of currently stored data in the read ahead buffer, and an access to the read ahead buffer by a different input/output device.

8. The integrated circuit as recited in claim 1 wherein the buffer valid indication is determined to be invalid at the end of a direct memory access (DMA) transfer.

9. An integrated circuit coupled between system memory of a computer system and an input/output channel, comprising:
   an input/output request circuit coupled to receive a read request for data in system memory from an input/output device over the input/output channel;

a read ahead buffer coupled to the input/output request circuit, strong data from a previous read access to system memory, the input/output request circuit coupled to selectively provide data from one of the system memory and the read ahead buffer in response to the read request; and a control register associated with at least one input/output device, the control register specifying whether block read ahead is active for the one input/output device.

10. A method of operating a computer system including a read ahead buffer coupled to a memory controller and an input/output controller coupled to an input/output channel, comprising:

receiving a read request for data from an input/output device over file input/output channel, the read request specifying an address in system memory;

determining whether at least a portion of the data requested in the read request is in the read ahead buffer, and selectively providing at least the portion of the data from one of the read ahead buffer and the system memory to the input/output device in response to the read request according to whether at least a portion of the selected data is in the read ahead buffer;

determining that data in the read ahead buffer is invalid according to at least one of an end of an input/output channel access, an end of a predetermined period of time after the read ahead buffer is indicated to be valid, access by the input/output device to an address outside of currently stored data in the read ahead buffer, and an access to an address contained in the read ahead buffer by a different input/output device; and wherein determining whether at least a portion of the data requested is in the read ahead buffer includes determining if the read ahead buffer has valid data.

* * * * *

UNITED STATES PATENT AND TRADEMARK OFFICE
CERTIFICATE OF CORRECTION

PATENT NO. : 6,389,488 B1
DATED : May 14, 2002
INVENTOR(S) : Geoffrey S. S. Strongin, David W. Smith and Norman Hack It is certified that error appears in the above-identified patent and that said Letters Patent is hereby corrected as shown below:

Column 9,
Line 15, replace "file" with -- the --.

Signed and Sealed this

Ninth Day of July, 2002

Attest:

Attesting Officer

JAMES E. ROGAN
Director of the United States Patent and Trademark Office